United States Patent [19]
Urban et al.

[11] 3,837,361
[45] Sept. 24, 1974

[54] EMERGENCY CONTROL VALVE

[75] Inventors: John A. Urban, Livonia; Gary L. Hopkins, Southfield; John Keith Armstrong, Livonia, all of Mich.

[73] Assignee: Eaton Corporation, Cleveland, Ohio

[22] Filed: Feb. 12, 1973

[21] Appl. No.: 342,894

Related U.S. Application Data
[62] Division of Ser. No. 192,438, Oct. 26, 1971, abandoned.

[52] U.S. Cl..................... 137/627.5, 303/9, 303/13, 303/29
[51] Int. Cl............................................. B60t 15/60
[58] Field of Search.......... 303/9, 13, 29; 137/627.5

[56] References Cited
UNITED STATES PATENTS

| | | |
|---|---|---|
| 3,097,021 | 7/1963 | Dobrikin.............................. 303/29 |
| 3,210,132 | 10/1965 | Alfieri............................... 303/29 X |
| 3,285,672 | 11/1966 | Avrea....................................... 303/9 |
| 3,304,131 | 2/1967 | Bueler................................... 303/29 |

*Primary Examiner*—Robert G. Nilson
*Attorney, Agent, or Firm*—Teagno & Toddy

[57] ABSTRACT

A brake control system for a towed vehicle which includes an emergency control valve operative in combination with an anti-skid system to provide emergency brake control in the event service pressure is lost. The emergency control valve senses the pressure level in the emergency line and supplies brake apply pressure from a reservoir on the towed vehicle when the emergency line pressure falls below a predetermined level. The valve is also usable with spring brakes such that the spring brakes provide a back-up parking brake without overriding the anti-skid control during emergency operation.

8 Claims, 3 Drawing Figures

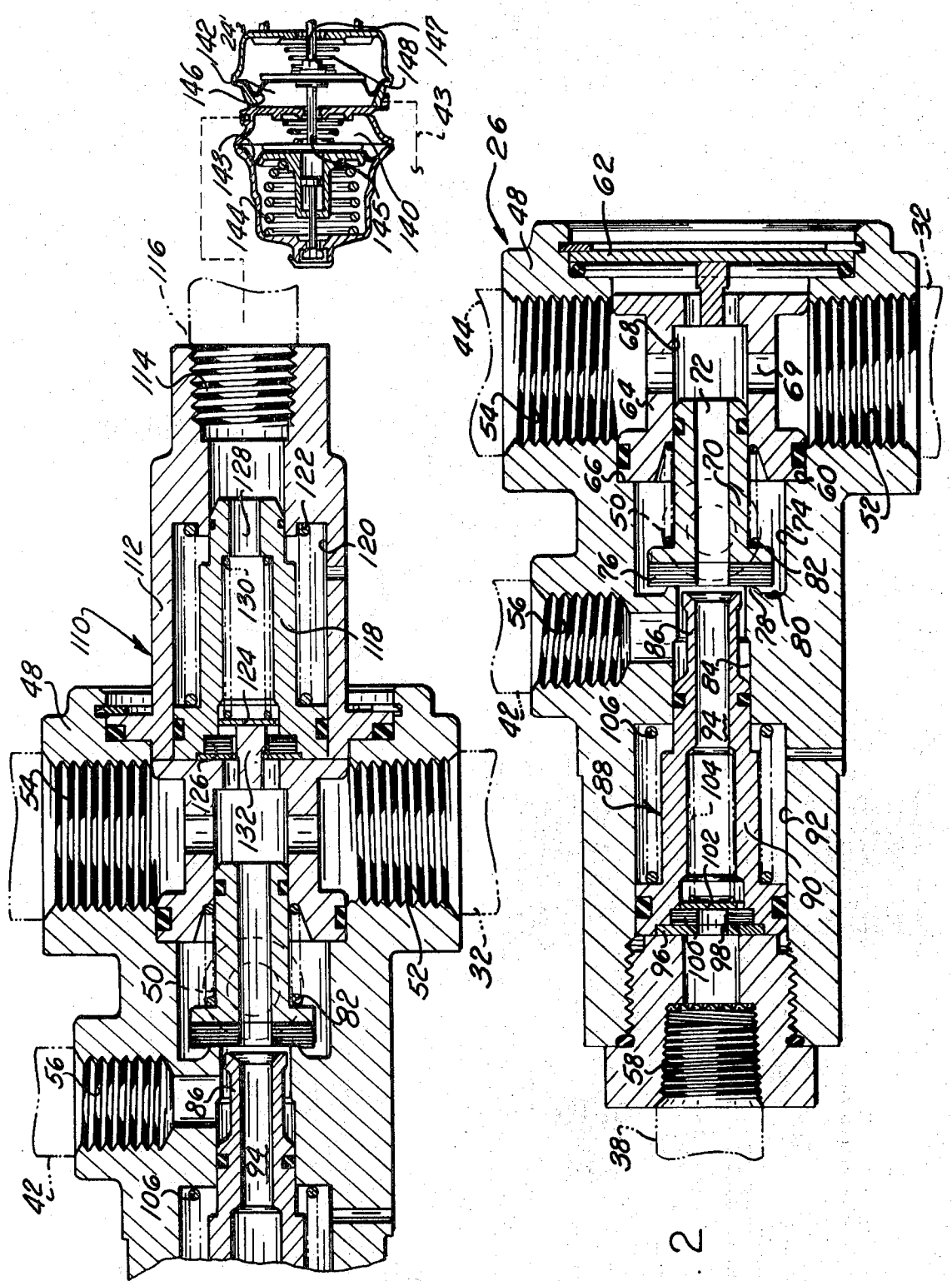

EMERGENCY CONTROL VALVE

This is a division of application Ser. No. 192,438 filed Oct. 26, 1971.

This invention relates to a brake control system and more particularly to a control valve and system for use in controlling application of the brakes on a towed vehicle.

It is an object of this invention to provide a brake control system for a towed vehicle in a rig such as a tractor-trailer unit equipped with air brakes and in which the brake control system includes an emergency control valve which is operative to sense the air pressure in the emergency line between the tractor and the towed vehicle and is operative to apply the brakes of the towed vehicle whenever the air pressure in that line falls below a predetermined level.

Still a further object of this invention is to provide a pneumatic emergency control system which can be used in combination both with an anti-skid system and with spring brakes, with the system being operative to provide antiskid control during emergency application of the brakes and with the spring brakes providing a back-up parking brake without overriding the anti-skid control during emergency operation.

Still another object of the invention is to provide an air operated brake system in combination with spring brakes and in which during emergency operation of the brakes the combined pneumatic brake applying pressure and the spring brake apply pressure are coordinated to provide a generally constant braking torque.

In accordance with one aspect of this invention, there is provided a brake control system for controlling the application of fluid operated brakes wherein the system includes a source of fluid pressure; valve means for controlling flow of pressure to the brakes; operator controlled means for controlling the flow of fluid pressure to the valve means and an emergency control valve connected to said source of fluid pressure, said valve means and said operator control means; a reservoir connected to said emergency control valve means; said emergency control valve means including a first valve member for selectively communicating the reservoir means with the source of fluid pressure and a second valve member for selectively interconnecting said valve means with said operator controlled means and said reservoir means; said second valve member being operative to connect said valve means with said operator controlled means when the pressure source is above a predetermined level and to connect said valve means with said reservoir means when the pressure from said source is below a predetermined level.

A further aspect of the invention is the provision of an emergency control valve of the above-described type, which is readily adapted for use with spring applied brakes by the addition of a spring brake adapter cartridge which cartridge includes a check valve operative to communicate reservoir pressure to the spring brakes and apply a hold-off pressure when the brake system is pressurized and which is further operative upon loss of system pressure to vent the hold-off pressure thereby allowing the springs or other suitable mechanical means automatically to apply the brakes.

Still a further aspect of the invention is an emergency brake control system which utilizes the above described emergency control valve in combination with spring applied brakes and an anti-skid control, and wherein the anti-skid control is operative during emergency application of the brakes and the spring applied brakes gradually become effective without overriding the skid control operation.

Other aspects, objects and features of the invention will be more apparent upon a complete reading of the following description which, together with the attached drawings, discloses but a preferred form of the invention.

Referring now to the drawings wherein like reference numerals indicate like parts in the various views:

FIG. 2 is a longitudinal sectional view through the emergency control valve.

FIG. 3 is a partial longitudinal sectional view of the valve of FIG. 2 modified by the addition of a spring brake adapter cartridge.

Figure 1:
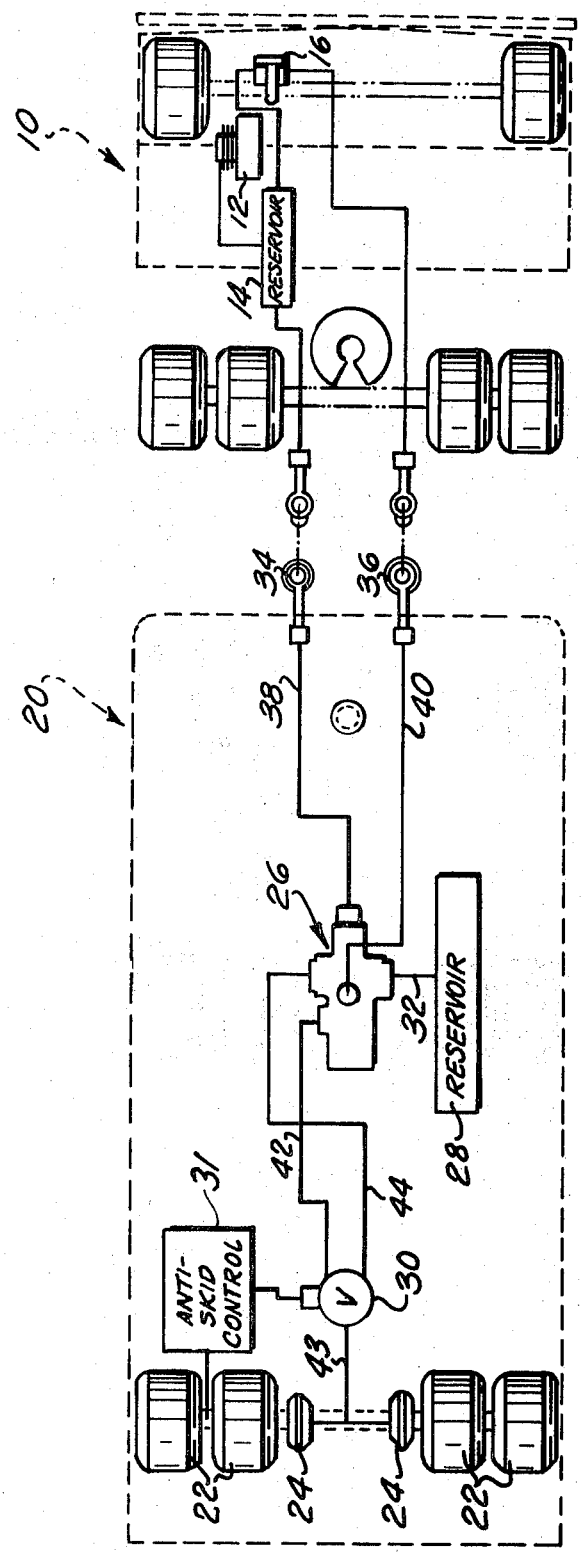
FIG. 1 is a schematical illustration of a tractor-trailer unit equipped with the brake control system and emergency control valve of the instant invention.

Referring now to FIG. 1, there is schematically illustrated a tractor-trailer arrangement in which the valve and brake system of this invention may be employed. As illustrated, a tractor indicated generally by the reference numeral 10 includes a conventional source of pneumatic pressure as shown by the compressor 12. The compressor 12 is connected to a supply reservoir 14. In addition, the tractor includes a conventional manually operated treadle valve 16 which is connected to the reservoir 14.

Also schematically depicted in FIG. 1 is a conventional trailer unit indicated generally by the reference numeral 20 and which is adapted to be connected to the tractor 10. The trailer includes conventional brakes, not shown, associated with the wheels 22 with the brakes being adapted to be actuated by conventional brake acurators 24. The trailer also includes a pneumatic system for actuating the brakes, which system includes a control valve 26, an emergency supply reservoir 28, and a relay valve 30. The relay valve 30 is preferably of the construction shown in co-pending application Ser. No. 271,824 filed July 14, 1972, assigned to the assignee herein, and is intended to cooperate with a suitably skid control circuit, generally indicated at 31, to provide a skid control function.

The reservoir 28 is connected to the valve 26 by a reservoir line 32. The valve 26, in turn, is connected to an emergency line 38 and a service line 40. Suitable gladhand connectors 34, 36 connect service line 40 to the treadle valve 16 and emergency line 38 to the tractor reservoir 14. An application line 42 connects the valve 26 with the pilot portion of the relay valve 30 while a supply line 44 connects valve 26 and the service portion of the relay valve 30. Line 43 connects valve 30 with the actuators 24.

The above-described system functions to supply pneumatic pressure to the relay valve 30 under control of the manually operated treadle valve 16 during normal operation of the brake system. In addition, the system contemplates that the relay valve 30 will provide a skid control function in the manner described in the afore-mentioned co-pending application in the event a skid condition is encountered by the tractor-trailer unit. The valve 26, and the disclosed system in which it is incorporated, are intended automatically to apply the brakes when the supply lines between the tractor and the trailer are either severed or otherwise inadvertently disconnected or when the towed vehicle is parked and the tractor disconnected.

Turning now to FIG. 2, one form which the emergency control valve 26 may take is illustrated. The valve 26 comprises a valve housing 48 having five ports: a service port 50, a reservoir port 52, a supply port 54, an application port 56, and an emergency port 58. The valve chambers internal of the housing 48 comprise a plurality of co-axial counterbored portions which include a first chamber 60 in communication with ports 52, 54. An appropriate closure 62 closes one end of that chamber. A bobbin 64 is received in the chamber 60 with one end of the bobbin abutting a radial shoulder 66. The bobbin 64 has a longitudinal internal passage or bore 68 with radial passages 69 providing communication between the exterior of the bobbin and the bore 68.

Slidably received in the bore 68 is a spool assembly 70 in which a longitudinal fluid passage 72 is formed. The other end of the spool assembly extends into a chamber 74. An appropriate seal 76 is carried on one end of the spool 70 and is adapted to sealingly engage an annular lip 78 formed on a radial shoulder 80. A seal spring 82 biases the spool assembly 70 to a position where it normally is in engagement with the annular lip 78. The service port 50 is in fluid communication with the chamber 74.

The application port 56 communicates with a third chamber 84. Extending into the chamber 84 is a nose portion 86 of a check valve spool assembly 88 which includes a spool portion 90 slidably received in a chamber 92. A passage 94 extends through the check valve spool assembly. A primary seal 96 is carried on one end of spool portion 90 and is adapted to abut a shoulder 98. A check seal 100 also carried by spool portion 90 is adapted to be engaged by a check valve plate 102 in passage 94. The check valve plate 102 is biased by a check valve spring 104 to a position where the plate engages the seal 100 and closes the opening through the two seals 96, 100. A primary spring 106 acts to bias the check valve spool assembly 88 to the left as viewed in FIG. 2 whereby the seal 96 engages the shoulder 98 and the nose portion 86 is axially spaced from the seal 76 on the spool assembly 70.

The described valve 26 and control system operate in the following manner. With the gladhand connectors 34, 36 connected and before the vehicle is started, the condition of the valve is as shown in FIG. 2. Upon starting the engine, the compressor 12 builds up air pressure in the reservoir 14 to a pre-set level. This air pressure is transmitted via emergency line 38 to the emergency port 58. The air pressure at the emergency port 58 acts against the check valve plate 102 to displace that plate away from the seal 100 against the bias of spring 104 thereby allowing the air to flow around the plate, through the passage 94, through passage 72 into bore 68 and then through the radial passages 69 into the reservoir 28. The supply port 54, which is also connected by radial passages 69 to the chamber 68, is also exposed to the incoming air pressure. Similarly, the application port 56 is communicated to the incoming air pressure by the radial clearance between the periphery of the nose portion 86 and the walls of chamber 84. The spring constant of primary spring 106 is selected such that as long as the air pressure entering the emergency port 58 is less than a selected value, as for example, 60 psi, the check valve spool assembly 88 remains in the position shown in FIG. 2. However, as the air pressure builds up to a predetermined value governed by the spring 106, the check valve spool assembly 88 shifts to the right compressing the spring 106 and seating the end of the nose portion 86 against the seal 76.

The air pressure acting on the check valve spool assembly 88, which is now in engagement with spool assembly 70, also causes an axial of that assembly. In this condition of the valve, the seated engagement of the nose portion 86 against the seal 76 on the adjacent end of the spool assembly 70 isolates the application port 56 from the air pressure in the emergency line 38. However, due to the shifting movement of the spool assembly 70, the application port 56 is placed in communication with the service port 50. The valve is now in a normal braking mode in which the air pressure delivered to the application port 56 and, hence, to the pilot operator of relay valve 30, is under the direct control of the operator actuated treadle valve 16 so that the operator can control, through operation of the treadle valve 16, the degree to which the trailer brakes are applied.

The pressure in reservoir 28 continues to rise to compressor-governed preessure by flow from the emergency line 38 through the check valve plate 102. Upon stabilization of the compressor pressure, the check valve plate 102 will close under the bias of spring 104.

During normal braking of the vehicle, operation of treadle valve 10 will communicate pressure from reservoir 14 via service port 50 and application port 56 to the pilot portion of relay valve 30. This pressure will, in the manner described in the above-mentioned application, actuate the valve 30 to admit brake-apply pressure to actuators 24. This brake-apply pressure originates in reservoir 28 and is transmitted to valve 30 by conduits 32 and 44. It will be appreciated that, in the event any pressure imbalance is created across check valve 102 by reason of the application of the brakes, the check valve will open and additional air pressure will be admitted to bring reservoir 28 back up to the compressor-governed pressure.

If, during normal braking, a skid condition occurs, the skid control circuit 31 will be operative to generate a signal which will energize a solenoid associated with valve 30 to relieve the pilot pressure and relieve the brakes, as described in the co-pending application. When the skid condition has been corrected, the valve 30 returns to a normal relay operation.

In the event the pressure in the emergency line 38 should drop for any reason, as for example, where the emergency line is disconnected after the trailer is parked. the pressure in the emergency line which has maintained the check valve spool assembly 88 shifted to the right disappears enabling the primary spring 106 to move the check valve spool assembly to the left as viewed in FIG. 2. This movement of the check valve spool assembly also results in axial shifting of the spool assembly 70 back to the position shown in FIG. 2 in which the service port 50 is isolated from the application port 56. Thereafter, the nose portion 86 of the check valve spool assembly moves away from the seal 76 on the spool assembly, thereby placing the application port 56 in fluid communication through chamber 84, passage 72, and passages 69 with the full pressure in the reservoir 28. The communication of reservoir pressure to the pilot-operated portion of the relay valve 30 actuates the valve to supply full brake-apply pressure to the brakes of the trailer.

The same sequence of operation will occur to apply the brakes in the event the emergency line is inadvertently disconnected while the tractor-trailer unit is in operation. However, locking of the trailer wheels due to the abrupt application of full reservoir pressure is avoided by the presence of the valve 30 which, in combination with the skid control system, is effective to apply and release the brakes in a manner fully described in the aforementioned pending application.

The same basic system shown in FIG. 1 can be used with spring applied brakes by the addition of a spring brake adapter cartridge, indicated generally by the reference numeral 110, to the control valve 26. The valve with the spring brake adapter is used with a brake actuator of the type in which a spring or other mechanical means is normally operative to apply the brakes with fluid pressure being used to overcome the spring bias and hold the brakes released. One form of a spring brake actuator 24' is schematically illustrated in FIG. 3.

The cartridge 110 comprises a cartridge housing 112, one end of which is connected to the valve housing 48 in place of the closure plate 62. The other end of the cartridge housing 112 defines a port 114 connected to a line 116 which is, in turn, connected to the brake hold-off pressure chamber of the brake actuator 24'. The cartridge housing 112 further includes a check valve spool assembly 118 which is slidably received in a bore 120. A spring 122 normally biases the check valve assembly to the left is viewed in FIG. 3. A check valve plate 124 is adapted to cooperate with a check valve seal 126 to control the flow of fluid through an internal passage 128 in the spool assembly. A check valve spring 130 biases the plate 124 towards the seal 126; however, a projection 132 on bobbin 64 is positioned to engage plate 124 and maintain the plate out of sealing engagement with seal 126 when the valve is in the condition shown in FIG. 3.

The spring brake actuator 24' schematically illustrated in FIG. 3 comprises a pair of pressure chambers, a brake hold-off pressure chamber 140 and a service or brake applying pressure chamber 142. A brake apply spring 144 normally acts on one side of a disphragm 143 to bias a piston 145 and a second diaphragm 146 to the right as viewed in FIG. 3. A brake apply rod 147 biased by a suitable spring 148 into engagement with the diaphragm 146. As the diaphragm 146 is shifted to the right under the bias of spring 144, the rod 147 is also shifted to the right to apply the brakes in a known manner.

The operation of the valve with the spring adapter 110 and the brake actuator 24' will now be described. Assuming the unit is at rest and no pressure in the system, the operative portions of the valve and the brake actuator are as illustrated in FIG. 3. Upon starting the vehicle and actuating the compressor 12, pressure in emergency line 38 is communicated through passage 128 and hold-off line 116 to the spring hold-off chamber 140 of the brake actuator 24'. The pressure in brake hold-off chamber 140 ultimately reaches a level at which it is effective to bias the diaphragm 143 to the left and compress the spring 144 thereby permitting the spring 148 to bias the diaphragm 146 and the rod 147 to the left. This action thereby releases the brakes of the vehicle. As the pressure in the system reaches a level sufficient to overcome the bias of spring 122, the check valve spool assembly 118 is shifted to the right and, as the system pressure stablizes, the check valve plate 124 will close. It will be appreciated, of course, that the functioning of the other portions of the valve are as previously described.

During operation of the vehicle, actuation of the treadle valve 16 by the operator is effective to introduce fluid pressure through line 43 to the brake apply chamber 142. The fluid pressure in this chamber acts against the diaphragm 146 to overcome the bias of spring 148 and shift the rod 147 to actuate the brakes. At the same time, the brake hold-off pressure is maintained in chamber 140 so that the actuation of the brakes is solely under the control of the operator. If, during the braking cycle a skid condition is encountered, the skid control circuit 31 and the valve 30 will be effective to control the brake pressure applied to the brake apply chamber 142.

If for any reason the pressure in the emergency line 38 should decrease to a level which permits the check valve spool assembly 88 to move to the left, reservoir pressure will then be communicated to the pilot portion of relay valve 30 to apply the brakes in the same manner as described previously. However, it should be noted that with the application of reservoir pressure, the spring hold-off chamber 140 remains pressurized until the reservoir pressure decreases to a predetermined level. Thereafter, further drop in reservoir pressure below a predetermined level will result in the check valve spool assembly 118 shifting to the left causing the check valve plate 124 to engage the projection 132 and permitting pressure in the hold-off chamber 140 to begin to decrease. As the pressure in chamber 140 decreases the spring 144 becomes increasingly effective to exert a brake applying force to rod 147. Thus, as the reservoir pressure decreases and, therefore, the apply pressure in chamber 142 decreases, the brake applying force exerted by spring 144 increases with the result that a generally constant brake torque is produced.

This latter aspect of the interaction between the control valve and the spring brake actuator may be illustrated by the following example. Assuming a reservoir pressure of 100 psi, the brake hold-off chamber 140 will also be pressurized to that level. If the trailer is being parked and the emergency line 38 is disconnected, the spring 106 will become effective to shift the check valve spool assembly 88 to the left and communicate full reservoir pressure to the pilot operator of the valve 30 which, in turn, will communicate full reservoir pressure to the brake apply chamber 142 to apply the brakes. In this parked condition, it will be noted that the brakes on the trailer are applied by the fluid pressure in the system. The drop in reservoir pressure resulting from application of the brakes is not sufficient to permit the spring 122 to move the check valve spool assembly 118 to the left so that the pressure in the brake hold-off chamber 140 is maintained at 100 psi. However, if while the vehicle is parked, the pressure in the system should decrease, the spring 144 is always available as a back-up to provide a brake apply pressure.

If, while the vehicle is in operation, the emergency line pressure drops below a predetermined level such as 60 psi, reservoir pressure will be communicated to the pilot operator and the brakes will be applied as previously described. If the brakes are applied without a skid being encountered, reservoir pressure will decrease only a small amount and the brake hold-off chamber 140 will remain, pressurized to 100 psi. However, if a skid condition due to the application of full reservoir pressure is encountered, the valve 30 will be cycled to alternately vent the brake apply chamber 142 and reapply pressure to that chamber. The cycling of the valve 30 will cause the reservoir pressure to decrease. As the reservoir pressure drops to, for example, 50 psi, the pressure opposing spring 122 will be just sufficient to maintain assembly 118 shifted to the left. Any further decrease in reservoir pressure results in assembly 118 shifting under the bias of spring 122 opening check valve 124 and permitting the pressure in chamber 140 to begin to drop. As reservoir pressure drops from 50 to 40 psi the spring hold-off brake pressure may, for example, drop to 60 psi which is just sufficient to maintain the spring 144 compressed. As reservoir pressure continues to drop from 40 psi to 35 psi, the spring brake pressure may drop from 60 psi to 35 psi, thereby, enabling the spring 144 to become effective to apply a brake pressure which complements the brake pressure being applied by the decreasing reservoir pressure. As the reservoir pressure continues to decline, the pressure in chamber 140 will decrease correspondingly so that as the brake apply pressure exerted by the fluid decreases the brake apply force exerted by the spring 144 correspondingly increases to produce a generally constant brake torque.

It is to be understood that the foregoing example of pressure relationships are merely exemplary and that different pressure relationships may be utilized depending on the specific brake system.

While the invention has been described with reference to a preferred embodiment, neither the illustrated embodiment nor the terminology employed in describing it is intended to be limiting rather, it is intended to be limited only by the scope of the appended claims.

What is claimed is:

1. A flow control valve comprising:
A. a valve housing;
B. first, second and third ports in said housing adapted to be connected to sources of fluid pressure;
C. an outlet port in said housing;
D. flow control means in said housing for selectively communicating said outlet port either with said first and second ports or with said third port; and E. said flow control means including
 1. first and second longitudinally movable valve members having coaxial fluid passages therethrough,
 2. means biasing said second valve member to a position preventing communication between said outlet port and said third port,
 3. means biasing said first valve member to a position spaced from said second valve member, and 4. said first valve member having a portion operatively exposed to the pressure at said first port to produce a force which acts to overcome the bias on said first valve member and to shift said first valve member into engagement with said second valve member, whereby said outlet port is communicated with said first and second ports when said force is less than the bias on said first valve member and said outlet port is communicated with said third port when said force is greater than said bias on said first valve member.

2. A flow control valve comprising:
A. a valve housing;
B. first, second and third ports in said housing adapted to be connected to sources of fluid pressure;
C. an outlet port in said housing;
D. flow control means in said housing for selectively communicating said outlet port either with said first and second ports or with said third port; and E. said flow control means including
 1. a valve member shiftable to a first position preventing communication between said third port and said outlet port and to a second position permitting communication between said third port and said outlet port,
 2. a fluid passage through said valve member providing communication between said second port and said outlet port, and
 3. means responsive to the fluid pressure at said first port and operative to close said passage and to shift said valve member from said first position to said second position when the pressure at said first port is above a predetermined level.

3. A flow control valve comprising:
A. a valve housing;
B. first, second and third ports in said housing adapted to be connected to sources of fluid pressure;
C. an outlet port and a hold-off port in said housing;

D. flow control means in said valve housing for selectively communicating said outlet port either with said first and second ports, or with said third port, or with said third port and said hold-off port;
E. said flow control means including
 1. first means responsive to the fluid pressure at said first port and operative to communicate said outlet port with said third port when the pressure at said first port is above a first predetermined level, and operative to communicate said outlet port with said second port when the pressure at said first port is below a predetermined level, and 2. second means responsive to the pressure at said second port and operative to communicate said second port with said hold-off port when the pressure at said second port is below a second predetermined level.

4. A flow control valve comprising:
A. a valve housing;
B. first, second and third ports in said housing adapted to be connected to sources of fluid pressure;
C. an outlet port and a hold-off port in said housing;

D. flow control means in said housing including
 1. first means responsive to the pressure at said first port and operative to communicate said outlet port with said third port when the pressure at said first port is above a first predetermined level, and operative to communicate said outlet port with said second port when the pressure at said first port is below said first predetermined level, and 2. second means responsive to the pressure at said second port and operative to allow to and fro fluid communication between said second port with said hold-off port when the pressure at said second port is below a second predetermined level.

5. The control valve of claim 4, wherein said second predetermined level is less than said first predetermined level, whereby said second port and said hold-off port are communicated with said outlet port when the pressure at said first and second ports is below said first and second predetermined levels respectively.

6. The control valve of claim 4, wherein said second pressure responsive means includes:
E. a shiftable valve member having a passage therethrough; and
F. means biasing said valve member to a position allowing to and fro communication between said second port and said hold-off port.

7. The control valve of claim 4, wherein said second pressure responsive means includes:
E. a shiftable valve member movable between a first position and a second position and having
1. a passage therethrough, and
2. a portion operatively exposed to the pressure at said second port and responsive to such pressure above said second predetermined level to move said valve member to said second position;
F. check means disposed in said passage and operative when said valve member is in said first position to allow to and fro fluid communication between said second port and said hold-off port, and operative when said valve member is in said second position to only allow fluid communication from said second port said hold-off port; and
G. means biasing said valve member to said first position and operative to move said valve member to said first position when the pressure at said second port is below said second predetermined level.

8. A flow control valve comprising:
A. a valve housing;
B. first, second and third ports in said housing adapted to be connected to sources of fluid pressure;
C. an outlet port and a hold-off port in said housing;
D. first flow control means in said housing including
1. first and second longitudinally movable valve members having coaxial fluid passages having engageable adjacent ends and defining a through passage,
2. said first valve member passage having an end communicating with said first port,
3. said second valve member passage having an end communicating with said second port,
4. check means disposed in said first valve member passage and operative to only allow fluid flow from said first port to said first valve member passage;
5. means biasing said first valve member to a position spaced from said second valve member,
6. means biasing said second valve member to a position preventing communication between said outlet port and said third port, and
7. said first valve member having a portion operatively exposed to the pressure at said first port to produce a force which acts to overcome the bias on said first valve member and to shift said first valve member into engagement with said second valve member, whereby said outlet port is communicated with said first and second passages when said force is less than the bias on said first member and said outlet port is communicated with said third port when said force is greater than said bias on said first valve member; and
E. second flow control means in said housing including
1. a shiftable valve member movable between a first position and a second position,
2. a passage through said shiftable valve member communicating at one end with said second port and at the other end with said hold-off port,
3. check means disposed in said shiftable valve member passage and operative when said shiftable valve member is in said first position to allow in and fro fluid flow between said second port and said hold-off port, and operative when said shiftable valve member is in said second position to only allow fluid flow from said second port to said hold-off port,
4. means biasing said shiftable valve member to said first position; and
5. said shiftable valve member having a portion operatively exposed to the pressure at said second port to produce a force which acts to overcome said bias to shift said valve member to said second position, whereby said check means only allows fluid flow from said second port to said hold-off port when said force is greater than said bias and said check means allows to and fro fluid flow between said second port and said hold-off port when said force is less than said bias.

* * * * *